United States Patent
Stough et al.

(10) Patent No.: US 11,117,659 B2
(45) Date of Patent: Sep. 14, 2021

(54) VARIABLE CROSS SECTION TETHER

(71) Applicant: Windlift LLC, Durham, NC (US)

(72) Inventors: Andrew Stough, Cary, NC (US); Mark Aull, Carrboro, NC (US)

(73) Assignee: Windlift LLC, Durham, NC (US)

( * ) Notice: Subject to any disclaimer, the term of this patent is extended or adjusted under 35 U.S.C. 154(b) by 310 days.

(21) Appl. No.: 16/340,600

(22) PCT Filed: Oct. 10, 2017

(86) PCT No.: PCT/US2017/055959
§ 371 (c)(1),
(2) Date: Apr. 9, 2019

(87) PCT Pub. No.: WO2018/071430
PCT Pub. Date: Apr. 19, 2018

(65) Prior Publication Data
US 2019/0248484 A1     Aug. 15, 2019

Related U.S. Application Data (60) Provisional application No. 62/406,320, filed on Oct. 10, 2016.

(51) Int. Cl.
| | | |
|---|---|---|
| B64C 39/02 | (2006.01) | |
| B64F 3/00 | (2006.01) | |
| F03D 5/00 | (2006.01) | |
| D07B 5/00 | (2006.01) | |

(52) U.S. Cl.
CPC ............. *B64C 39/022* (2013.01); *B64F 3/00* (2013.01); *D07B 5/005* (2013.01); *F03D 5/00* (2013.01); *D07B 2201/1004* (2013.01); *F05B 2240/917* (2013.01); *F05B 2240/921* (2013.01); *Y02E 10/70* (2013.01); *Y02E 10/728* (2013.01)

(58) Field of Classification Search
CPC ............. B64C 39/022; B64F 3/00; B64F 3/02
See application file for complete search history.

(56) References Cited

U.S. PATENT DOCUMENTS

| | | | | |
|---|---|---|---|---|
| 2,561,371 A | * | 7/1951 | Hill | F16G 9/00 24/129 R |
| 4,842,221 A | * | 6/1989 | Beach | B64D 45/02 174/107 |
| 8,350,403 B2 | * | 1/2013 | Carroll | B64C 39/022 290/55 |
| 9,650,136 B1 | * | 5/2017 | Haskin | B64C 39/024 |
| 2008/0048453 A1 | * | 2/2008 | Amick | B82Y 30/00 290/44 |
| 2011/0266395 A1 | * | 11/2011 | Bevirt | F03D 9/30 244/155 R |

(Continued)

*Primary Examiner* — Michael H Wang
(74) *Attorney, Agent, or Firm* — Tyler S. Dunham, Esq.

(57) ABSTRACT

The exemplary embodiments herein provide a tether for use with an airborne device, where the tether contains an elongate member having a first end for attaching to a ground attachment point and an opposing second end for attaching to the airborne device where the elongate member has a cross-sectional area which varies across the member. In some embodiments, the tether contains one or more electrically conductive elements, an optional strength element, insulation separating any adjacent electrically conductive elements, and a jacket which surrounds and protects each of the tether components.

20 Claims, 6 Drawing Sheets

(56) References Cited

U.S. PATENT DOCUMENTS

| | | | |
|---|---|---|---|
| 2014/0219799 A1* | 8/2014 | Selsam | F03D 3/002 |
| | | | 416/11 |
| 2019/0063398 A1* | 2/2019 | Quappen | F03B 17/065 |
| 2019/0103202 A1* | 4/2019 | Patten | H01B 7/18 |

* cited by examiner

VARIABLE CROSS SECTION TETHER

CROSS-REFERENCE TO RELATED APPLICATIONS

This application claims priority to and is a National Stage Filing from PCT Application No. PCT/US2017/55959 filed on Oct. 10, 2017, which claims priority to U.S. Provisional Application No. 62/406,320 filed on Oct. 10, 2016, both of which are herein incorporated by reference in their entirety.

TECHNICAL FIELD

Embodiments generally relate to tethers for use with various tethered airborne devices.

BACKGROUND OF THE ART

Tethers are utilized in a variety of applications. In particular, airborne wind energy (AWE) requires strong, lightweight tethers that constrain airborne kites to a ground station. The tether adds drag and weight to the kite, and can be a significant cost contributor to the overall AWE system. Total drag in the system is a primary factor in system performance and the tether contributes a significant amount of drag to the system, therefore minimizing tether drag while maintaining optimal performance is desirable.

SUMMARY OF THE EXEMPLARY EMBODIMENTS

Exemplary embodiments provide a tether for use with an airborne device in a fluid flow, where decreased drag, improved thermal performance, or improved mass characteristics are desired. Exemplary embodiments provide a tether having various thicknesses, shapes, layers, or other features along the length of the tether. When applied to AWE systems specifically, the tether may have a smaller cross sectional area near the airborne device while having a larger cross sectional area near the ground (or sea bed) attachment for the tether.

The foregoing and other features and advantages of the present invention will be apparent from the following more detailed description of the particular embodiments, as illustrated in the accompanying drawings.

BRIEF DESCRIPTION OF THE DRAWINGS

A better understanding of an exemplary embodiment will be obtained from a reading of the following detailed description and the accompanying drawings wherein identical reference characters refer to identical parts and in which.

DETAILED DESCRIPTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
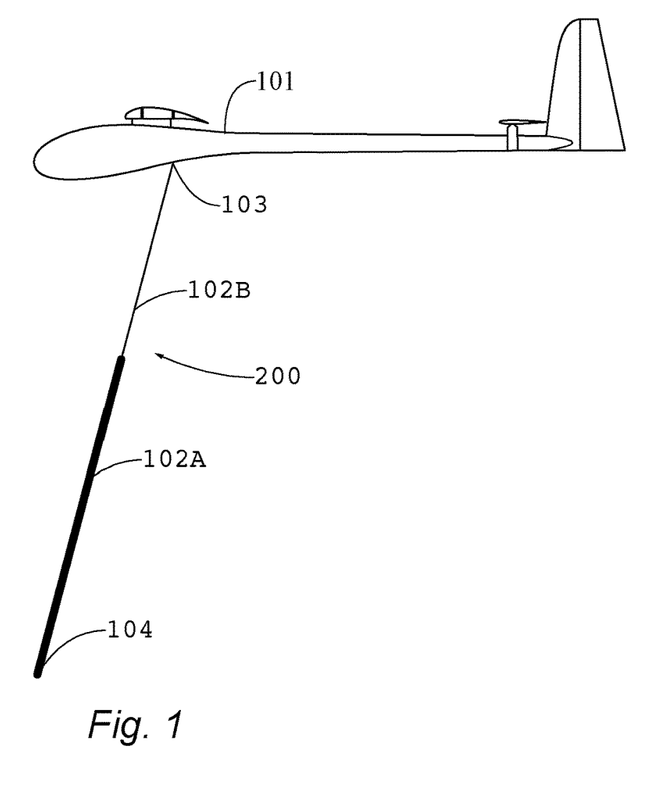
FIG. 1 is a front elevation view of a tethered airborne device with variable tether diameter.

The exemplary embodiments of the invention may provide a variable cross-section tether used to constrain an airborne object to a fixed location. The cross-sectional area preferably changes along the length of the tether and may be chosen to meet multiple objectives including but not limited to decreased aerodynamic drag, improved thermal performance, reduced cost, and improved weight balance. In many cases multiple objectives may be achieved simultaneously. FIG. 1 shows a tethered airborne device 101 connected at point 103 to a variable cross-section tether 200 consisting of thin section 102B and thick section 102A near the ground point 104. In many airborne wind energy applications, the tethered airborne device 101 flies actively in a high speed crosswind fashion. Therefore, the inertial speed of the airborne device 101 is generally much greater than the ambient wind speed.

Here it is important to note that the term "airborne device" as used herein, refers to any device that is suspended (either through propellers/wings/kite or through buoyancy) in a fluid (typically air but can also be operated underwater) and may be used to generate power or may not. There are many different types of airborne devices that could be used with the embodiments herein, these include but are not limited to kites, wings, helicopters, balloons, aircraft, foils, and flight vehicles. Thus, for clarity the term airborne device has been used herein to represent any and all of these possible devices, either used for energy generation (AWE) or for other purposes such as communication/satellite/GPS (commonly referred to as aerostats). In some exemplary embodiments, the tethers described herein can be used with airborne devices which combine the communication/satellite/GPS advantages of the aerostat with the energy production of the AWE devices.

Figure 2:
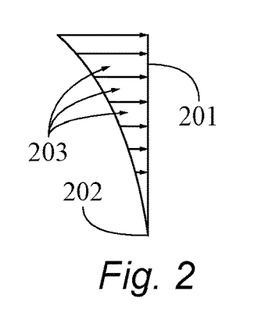
FIG. 2 is an illustration of a uniform tether from the ground station to the airborne device including a graph of the drag force along the tether.

Because the inertial speed of the tether increases linearly from zero at 104 to the airborne device speed at 103 and drag on the tether may be calculated as a function of the square of the apparent wind velocity, the portion of the tether near the airborne device contributes a majority of the overall tether drag. A drag load distribution along a uniform tether is shown in FIG. 2, which shows the drag forces 203 on the tether 201 increasing quadratically as the distance from the ground point 202 increases.

For a uniform cross-section tether, the lower 20% of the tether contributes less than 1% of the drag of the overall tether while the 20% of the tether closest to the airborne device contributes over half of the overall drag of the tether. So, it has been shown that the upper 20% of the tether is more than 50 times more influential to the overall tether drag than the lower 20%.

Figure 3:
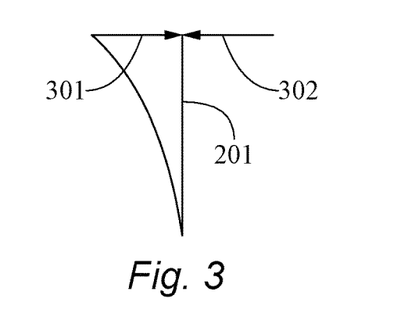
FIG. 3 is an illustration of a uniform tether including a graph of the force balance between the thrust applied by the airborne device and the drag force.
Figure 4:
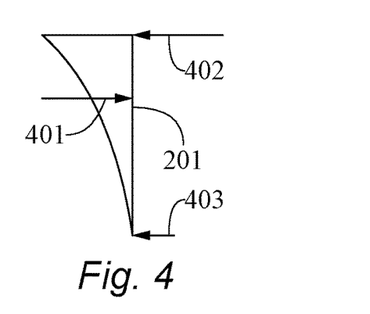
FIG. 4 is an illustration of a uniform tether including a graph of the force balance between the thrust applied by the airborne device, the drag force, and the reaction force at the ground station.

FIG. 3 displays how the summation of these forces is typically accounted for at the airborne device, i.e. that the entire resultant tether drag force 301 is applied at the airborne device. However, as shown in FIG. 4, the resultant drag force actually acts through the centroid of the quadratic load distribution as shown at 401, so the ground station reacts some of the drag force at the ground attachment point 403, effectively lowering the drag force transmitted to the airborne device at 402. The current literature does not appear to recognize this fact, which instead models the drag of the tether transferred to the airborne device using an approximation formula: $CDt,eff \approx 0.31 \, L \, (d/Ap) \, CDt$, Where $CDt$ is the aerodynamic drag coefficient of the tether in uniform flow, $Ap$ is the area of the airborne device (here area of the kite), $d$ is the diameter of the tether, $L$ is the length of the tether, and $CDt,eff$ is the effective tether drag referenced to the airborne device area.

This approximation considers a uniform tether. As current literature generally states, the constant coefficient 0.31 is present because the drag of the tether is only 31% of the drag that would be experienced if the whole of the tether were traveling at the speed of the airborne device. However, this approximation does not account for the portion of the tether drag force that is reacted at the ground station, which is an important factor for the exemplary embodiments of the current invention. (Note that the theoretical coefficient in a constant wind is 0.33. The 0.31 coefficient takes into account wind shear, but that calculation suffers from the same deficiency, i.e. the reaction at the ground is not taken into account.) Further analysis will neglect wind shear.

Figure 5:
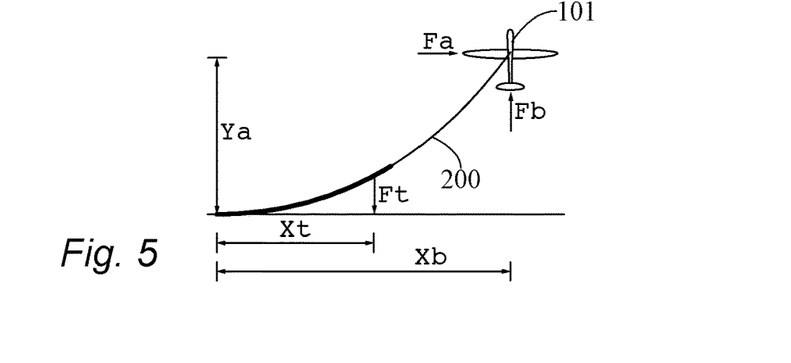
FIG. 5 is a front elevation view of a airborne device and tether showing the gravitational force balance.

Similarly, the weight of the tether closer to the airborne device exerts more force on the airborne device than the part of the tether closer to the ground. FIG. 5 shows how an exemplary embodiment of the invention moves the center of mass toward the ground attachment point by placing the thicker, heavier section of the tether 200 closer to the ground station. Fa is the drag force on the airborne device 101 due to the wind speed at a given point in time. Fb is the thrust or buoyant force needed to maintain a given altitude for a given drag force. Ft, the weight of the tether, is applied at the center of mass of the tether. The exemplary embodiment of the present invention moves more of the tether weight towards the ground station, which has the potential to reduce the weight of the tether 200 that the airborne device 101 has to bear. Again, this factor favors the use of a variable cross-section tether 200 in order to minimize applied load at the airborne device 101.

We have demonstrated that there is utility in varying the cross-section of the tether so that a smaller cross-sectional area exists closer to the airborne device. This can be accomplished in several ways while improving the utility of the tether.

One type of AWE (called fly-gen) requires an electrified tether, which in turn requires conductive elements within the tether. The following exemplary embodiment considers the case wherein the tether sizing is constrained by heat generation within the tether.

Figure 6:
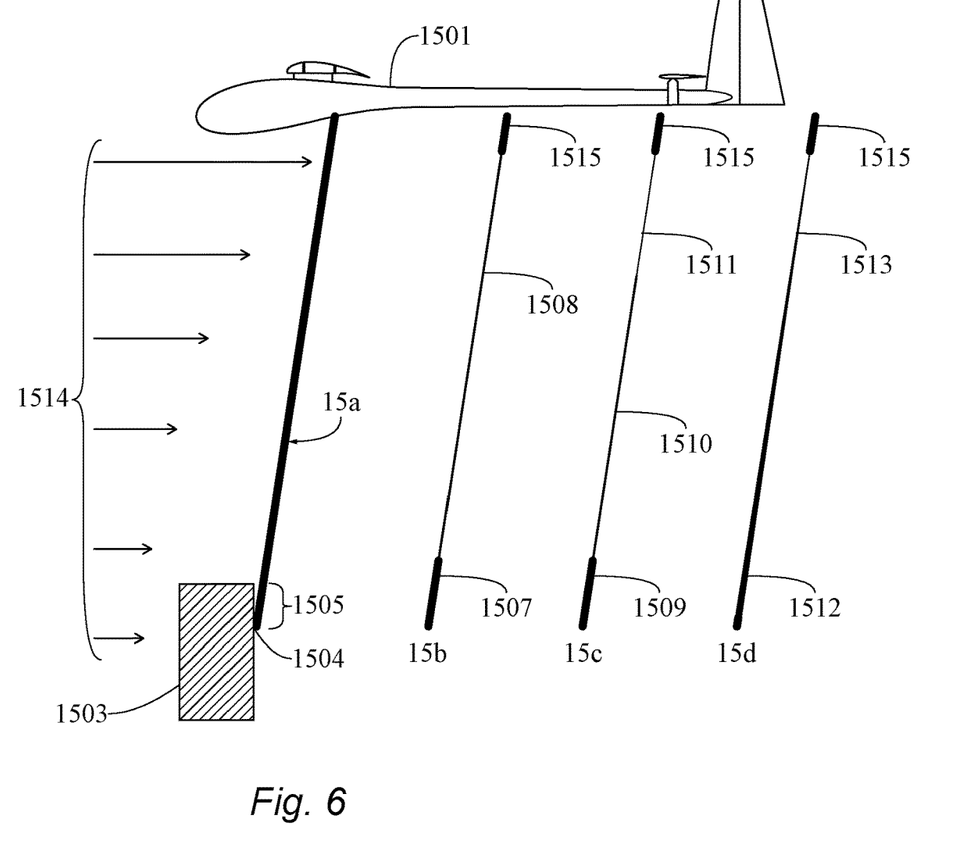
FIG. 6 is a front elevation view of a airborne device with a uniform tether and embodiments of variable section tethers.

In many cases, practical tether designs may be limited by the heat dissipation (so-called $i^2R$ losses) from the conductors. With a uniform cross-section tether, a constant tether section must be chosen based on the worst case heat transfer properties over the entire tether length. FIG. 6 is a diagram of an airborne device 1501 attached via uniform section tether 15a to fixed point 1504 on ground station 1503. Wind profile 1514 is increasing with altitude and, in the case of actively flown AWE airborne devices, with distance from the ground point 1504, and provides unencumbered flow and convective cooling over the upper portion of tether 15a. Wind speed near the ground is of relatively low magnitude due to wind shear effects and may be completely blocked from cooling tether 15A by ground station 1503, creating a potential hot spot in tether 15A in zone 1505. Additionally, electromechanical tethers must be mechanically terminated, which may further insulate either end of the tether, exacerbating the hot spot in zone 1505 and potentially creating a new hotspot at the upper terminus of the tether Preliminary calculations show that a convective heat transfer coefficient of as low as 5 W/m$^2$-K could be expected in zone 1505. Conversely, during active crosswind power generation flight, the heat transfer coefficient of the tether nearer to the airborne device 1501 could easily be 50-100 W/m$^2$-K, which would allow the tether to dissipate a larger amount of heat nearer to the airborne device 1501.

In this case, larger conductors may be required in zone 1505 to reduce local electrical resistance and generate less heat. With a uniform tether, the entire tether 15a maintains this section throughout and will be over-cooled and non-optimized along most of its length.

A more optimal system may employ a variable cross-section tether such as 15b with a larger end 1507 near the hotspot zone 1505 and a smaller section 1508 continuing to 1501.

Figure 7:
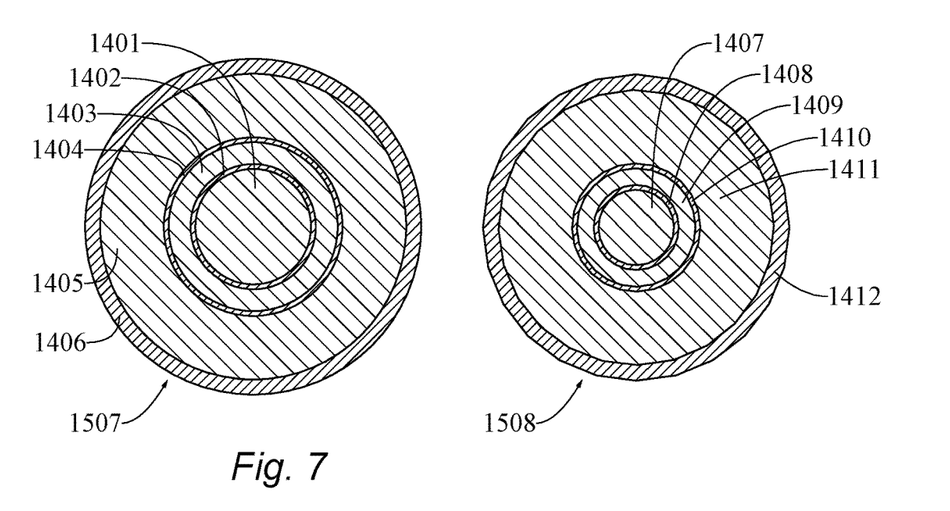
FIG. 7 is a section view showing cross-sections taken through a plane that is substantially perpendicular to the central axis of the tether, of embodiments of the thick tether section and the thin tether section.

FIG. 7 shows two tether cross sections corresponding to tether portions 1507 and 1508. Thicker tether section 1507, shows a large inner conductor 1401 which is generally aligned with the central axis of the tether, insulation layer 1402, outer conductor 1403, outer insulator 1404, strength member 1405, and jacket 1406. Thinner tether section 1508 shows a small central conductor 1407 which is generally aligned with the central axis of the tether, insulation layer 1408, small outer conductor 1409, outer insulator 1410, strength member 1411, and jacket 1412. In this exemplary embodiment, sections 1507 and 1508 may have the same insulation wall thickness 1402, 1404, 1408, 1410, the same cross-sectional area for the strength members 1405, 1410 and the same jacket thickness 1406, 1412. However, the large conductor sections 1401, 1403 are about twice the cross-sectional area of the small conductor sections 1407, 1409. The larger conductor sections will generate approximately 50% of the heat losses of the thinner section so as to not overheat in the lower convective cooling available in tether zone 1505. As shown, each layer is generally coaxial with one another and surrounds each adjacent layer, although not necessarily in contact with each other at all points along the tether. It should be noted that in each of the section views, the section lines do not necessarily indicate a completely solid or monolithic material. In many embodiments, the section lines would indicate cables or wires which are wrapped around one another, and thus true section views of these embodiments would show each individual thread, fiber, or cable and would thus be difficult to show properly to scale. Thus, as used herein, terms like "electrical conductor" or "strength member" or similar can refer to both solid/monolithic elements as well as bundles of smaller elements such as threads, fibers, or cables.

It should be specifically noted that the section views shown in FIG. 7, where the conductors and strength members are co-axial, is not required for the invention and many alternative embodiments may not utilize this design. In other embodiments, the strength member 1405 and 1410 may travel alongside the conductors, but would not be co-axial. Similarly, in some embodiments the conductors 1401/1403 and 1407/1409 may not be co-axial, but would instead travel alongside one another with generally parallel axes. Instead, each element may have a separate central axis (which may be substantially parallel to the axis of the adjacent elements).

Another exemplary embodiment of a tether uses 3 different sections 15c. Larger end 1509 may be the same section as 1507 on tether 15b while portions 1510 and 1511 subdivide section 1508 from tether 15b into two portions taking advantage of the improved cooling as the tether approaches the airborne device 1501.

Another exemplary embodiment, tether 15d demonstrates a continuously variable tether section, implying a variable conductor section with thick end 1512 and thin end 1513. The conductors within this tether may be sized precisely to produce an optimized amount of heat based on the variable cooling present along the tether length. Section 1515 may be added to tethers 15b, 15c, and 15d, which would increase the conductor size locally at the upper terminus, respecting the decreased heat flow from the tether due to the termination.

Figure 8:
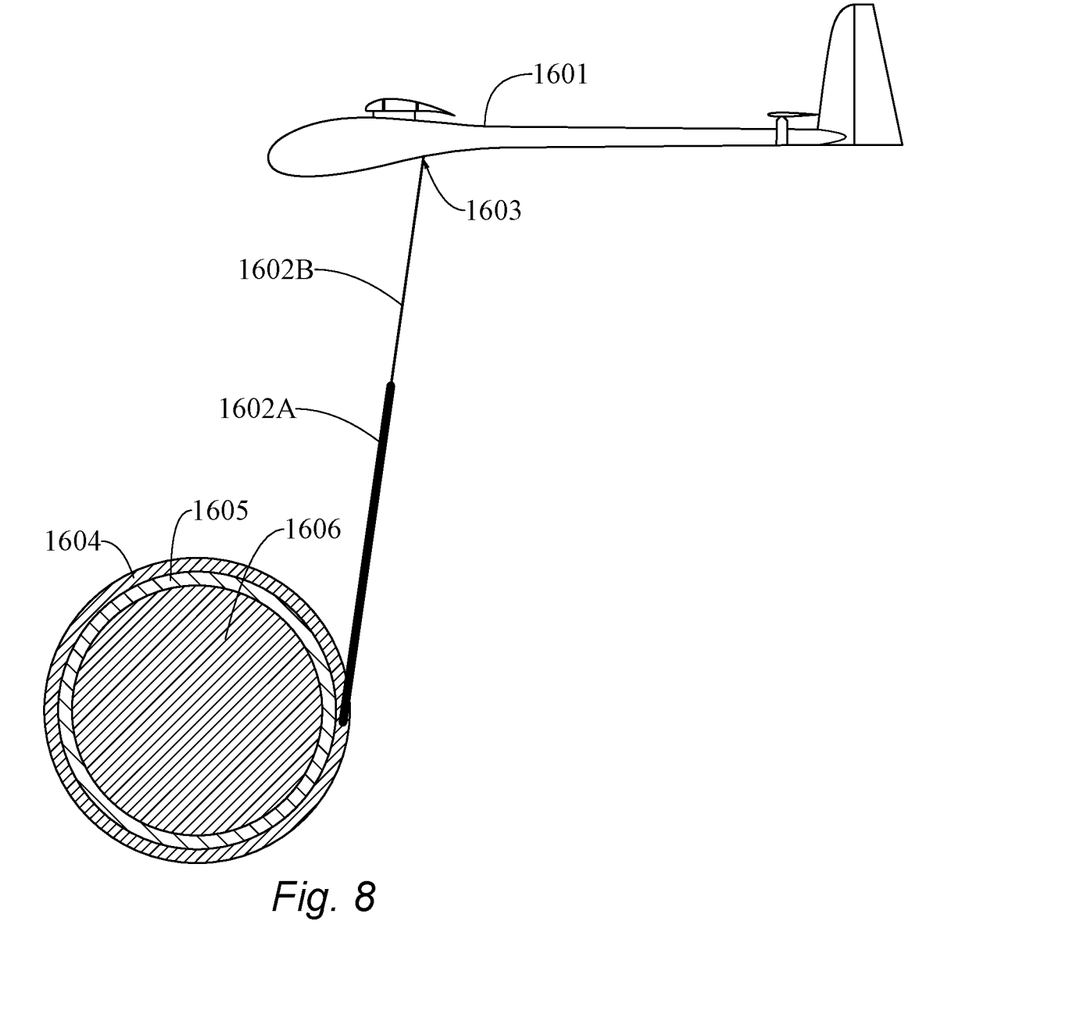
FIG. 8 is a front elevation view of a tethered airborne device with tether partially rolled onto a drum.

The exemplary embodiments described above teach how a heat-limited tether design may be optimized to reduce weight and cross-sectional area as the tether approaches the airborne device. These embodiments are advantageous for three reasons. First, the approach allows for a lower amount of conductor material to be used overall, reducing weight and drag of the tether. In the case of tether 15b up to a 10% improvement in aerodynamic performance factor could be achieved, along with substantial improvements in tether weight. Greater performance improvements are implied by 15c and 15d. Second, it creates a more uniform temperature distribution along the tether, eliminating hot spots which could reduce the life of the tether and allowing for the use of lower temperature construction materials. Third, as shown in FIG. 8, the tether may be stored on a drum 1606 when airborne device 1601 needs to be retrieved for service or during periods of low wind. Tether sections 1602A, 1602B may be stored on drum 1606 in 2 or more layers as shown by inner layer 1605 and outer layer 1604. The airborne device 1601 may be launched and landed utilizing power transmitted through tether 1602A, 1602B. In this case, during the launch/landing procedure the inner layer of the tether 1605 has no access to convective cooling and may overheat. Careful selection of conductor sizes and lengths within tether sections 1602A and 1602B may reduce the heat dissipation in lower layer 1605 in order to reduce this concern.

The tether may also be limited by total electrical resistance rather than heat dissipation. In practice the electrical resistance for the tether may be chosen to limit voltage drop in the tether, as a threshold for transmission efficiency, or for other reasons obvious to those skilled in the arts.

In order to more clearly demonstrate the advantages and application of this invention, consider a system with the following attributes:
Wing area: 25 m$^2$
Tether Length: 1000 m
Tether Voltage: 8 kV
Tether outside diameter: 19.2 mm
Specific mass of uniform tether: 0.32 kg/m
Tether tensile maximum load: 22.5 kN
Wind Speed: 10 m/s
CL of airborne device (kite): 1.2
Tether Resistance: 9 Ω
Power in tether: 100 kW
Aspect ratio: 16

According to these attributes, it has been discovered that the optimal electrical resistance for the tether is approximately 9 ohms. In order to reduce the area of the tether close to the airborne device, we first recognize that the electrical resistance of the tether does not have to be uniform along the length of the tether to fulfill the total required resistance. In this exemplary embodiment of the invention, an optimization was performed to split the overall electrical resistance into two segments that optimize the $Cl^3/Cd^2$ aerodynamic performance coefficient, tether weight, and thermal performance.

Figure 9:
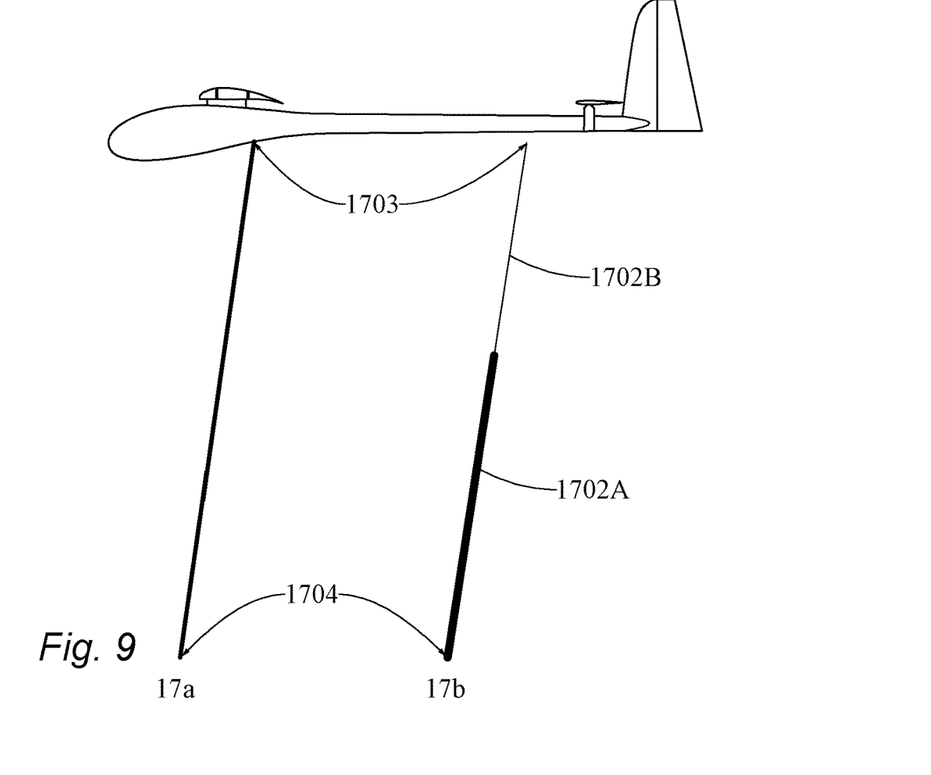
FIG. 9 is a front elevation view of a tethered airborne device with a variable section tether optimized for the case of a fixed electrical resistance.
Figure 10:
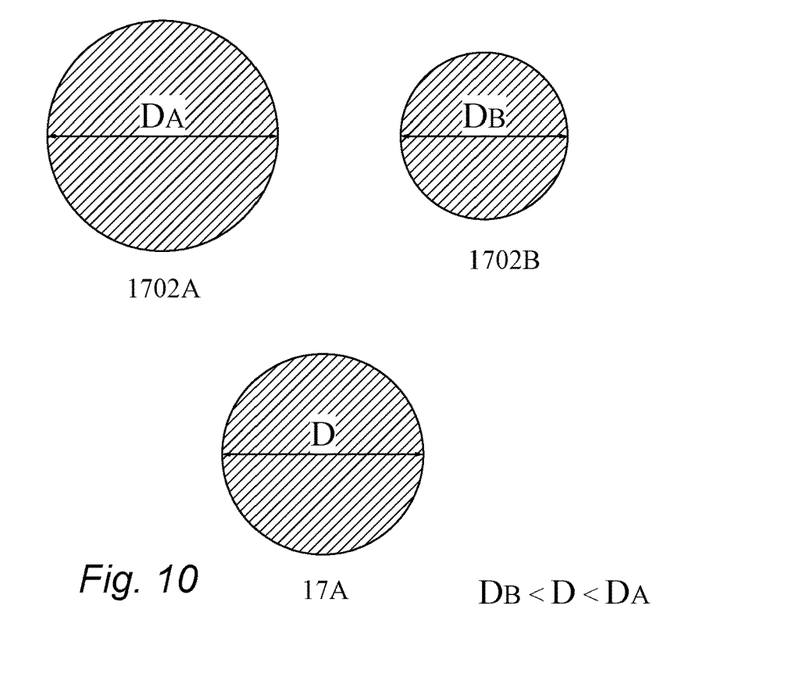
FIG. 10 is a section view showing various embodiments of the tether shown in FIG. 9, where the cross-sections are taken through a plane that is substantially perpendicular to the central axis of the tether.

FIG. 9 shows two tethers, uniform tether 17a and tether 17b made up of thicker section 1702A and thinner section 1702B. FIG. 10 shows section views taken through a plane that is substantially perpendicular to the central axis of the tethers 17a and 17b, including thicker section 1702A and thinner section 1702B.

As shown, the thicker section 1702A is made to be lower resistance, in this case 3.6 ohms, requiring more conductor material and resulting in a larger diameter as shown in 1702A. The upper section of the tether makes up the balance of the resistance at 5.4 ohms, allowing a smaller amount of conductor material to be utilized as shown in 1702B, reducing the cross-section on the fastest moving part of the tether and consequently the overall drag of the tether. In contrast to the heat optimized tether, the thicker section 1702A is actually larger than the nominal 17a section and the thinner section 1702B is smaller than the nominal 17a tether section. A numerical optimization shows that the thicker portion of the tether 1702A should extend for approximately 62% of the overall tether length, or approximately 620 m. The balance of the tether (380 m) consists of the thinner section 1702B portion of the tether. However, it has been found that embodiments where the thicker tether comprises between 50% and 70% of the overall tether length (the thinner tether providing the remainder of the length) will provide adequate performance. It has been further found that embodiments where the thicker tether comprises between 60% and 65% of the overall tether length has been found to be the most preferred. Note that section views in FIG. 10 omitted internal structure for clarity. In practice the diameter of the cables varies due to the same mechanism as shown in FIG. 7 and other cable winding variations, depending on the application.

Figure 11:
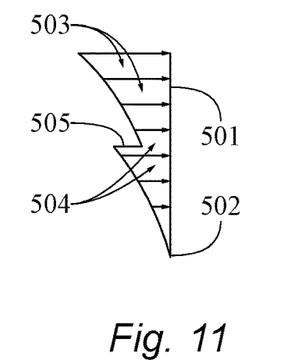
FIG. 11 is an illustration of a two-part non-uniform tether including a graph of the drag force along the tether.
Figure 12:
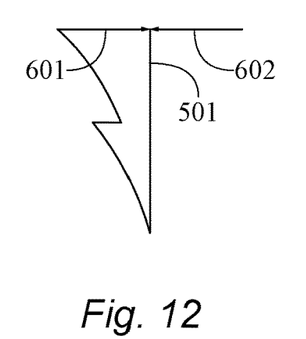
FIG. 12 is an illustration of a two-part non-uniform tether including a graph of the force balance between the thrust applied by the kite and the drag force.
Figure 13:
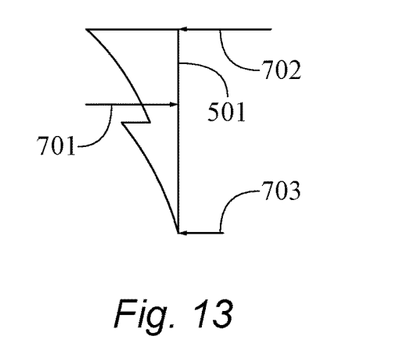
FIG. 13 is an illustration of a two-part non-uniform tether including a graph of the force balance between the thrust applied by the kite, the drag force, and the reaction force at the ground station.

The exemplary embodiments can increase the overall system aerodynamic performance coefficient from 42.52 to to 45.00, an increase of 5.8%. The difference in tether drag transferred to the airborne device is mostly due to the lowering of the drag centroid of the tether. FIG. 11 shows a sample distributed force on the non-uniform tether 501. A discontinuity in tether drag exists at the interface between the segments of tether 505. If we simply sum the resultant tether drag force and apply that force to the airborne device at 601, as shown in FIG. 12, we get a 1.3% improvement in overall performance. However, this ignores the reaction at the ground attachment point. The resultant drag force instead is applied at the drag force centroid 701, and a reaction force at the ground must be applied 703. This reaction force lowers the amount of the tether drag force that is transferred to the airborne device at 702, as shown in FIG. 13.

An embodiment of tether 17b described above may have a total weight of about 2643 N, whereas tether 17a has a total weight of about 2509 N. These weights consider summation of all components of the respective tethers, including conductors, strength members, insulators, and jacketing. This difference in weight is ~5%. However, a detailed catenary model taking into account the varying mass per unit length along the tether demonstrates that the force required to maintain an altitude of 561 m for the variable thickness tether is 2509N and for the uniform thickness tether 2530N. This difference in thrust required to hover is ~0.8%, which means that although the variable thickness tether is heavier, the force required to maintain altitude is slightly lower with the variable thickness tether due to the movement of the mass centroid toward the ground station.

Figure 14:
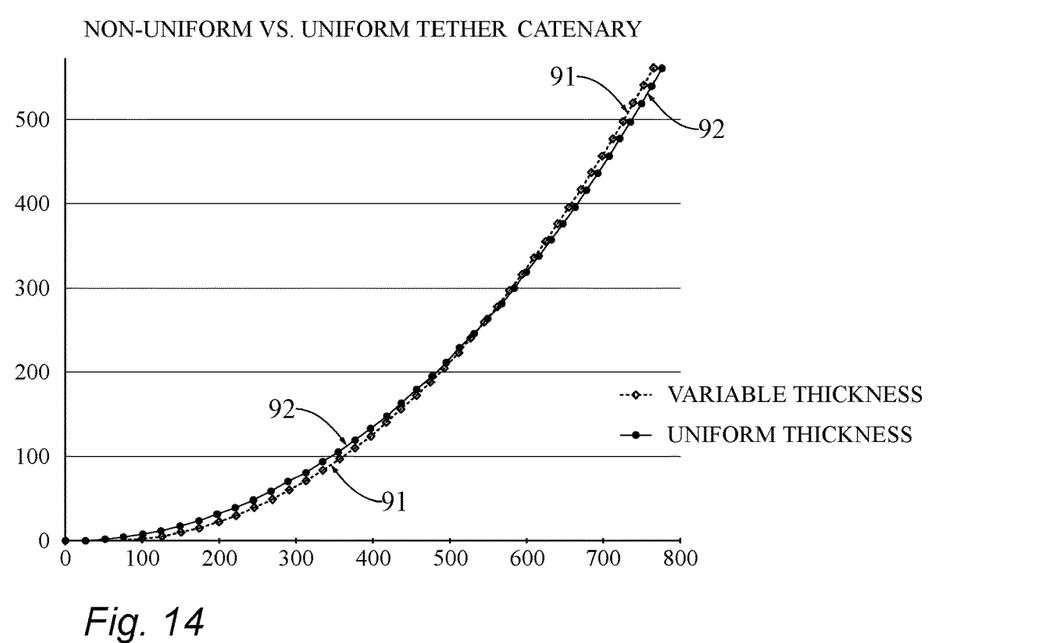
FIG. 14 is a graph of the positions of the uniform and non-uniform tethers at a fixed altitude and applied force from the wind.

FIG. 14 compares the catenary shapes of the two tethers. Variable thickness tether 91 sags lower than uniform thickness tether 92 in the first ~550 m. This catenary causes an airborne device with the variable thickness tether to be slightly closer to the ground station, by ~10 m. The design can be optimized to actually reduce the force required to maintain altitude as well. This analysis does not consider the performance of the tether when the airborne device is traveling in a flight pattern, but it is recognized that the weight performance may even be improved further due to the fact that the centripetal accelerations experienced in flight are large (3-6 g) and vary with the square of the distance from the center of rotation, favoring a lightweight tether closer to the airborne device.

For simplicity, a two segment tether was typically used as an embodiment of the present invention to show its utility. In practice it may be made up of 3 or more segments of constant section or of a continuously changing section optimized for the particular application, as shown with tether 15d in FIG. 6.

The exemplary embodiments described herein demonstrate a number of advantages. First, the aerodynamic drag force transferred from the tether to the airborne device is reduced, improving system performance. Our analysis for one exemplary embodiment shows a 5.8% improvement in overall system performance (power output) for the optimized tether system. For a large scale 1 GW facility, a first order approximation shows this improvement could lead to a lifetime energy production increase 2,200,000 MWh of electricity. At an assumed wholesale price of $70/MWh, the lifetime economic impact of such an improvement would be $157 million. The worldwide installed capacity for electricity increases by ~300 GW/year, so if even a small portion of the electricity is produced utilizing this invention, the economic value could run well into the billions of dollars.

Second, reducing the cross-section of the tether closer to the airborne device may reduce the effective weight of the tether as experienced by the airborne device, both in static operation and in dynamic crosswind flight. This may result in substantial performance improvements not considered in the above analysis.

Third, the amount of material used in the tether may be reduced substantially, reducing manufacturing costs.

Fourth, the thermal properties of the cable can be optimized for various conditions. Depending on the design of the tether, this could have substantial improvements in both weight and drag, the effects of which are again not included within the above economic analysis.

Figure 15:
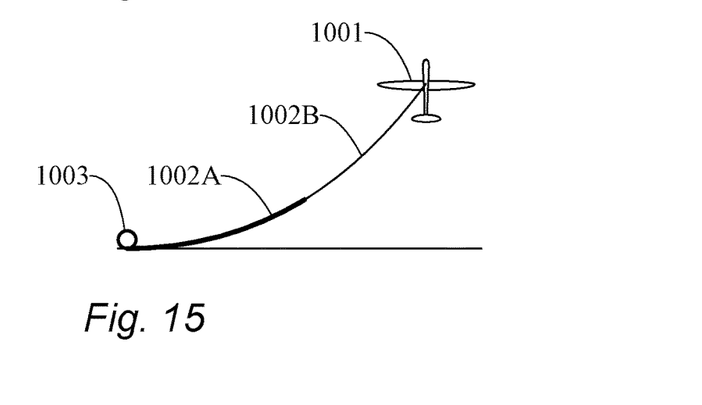
FIG. 15 is a front elevation view of a tethered aircraft showing a kite with variable cross section tether connected to a winch.

In another type of AWE, called ground-gen, the tether has no electrical conductors and so is made up primarily of strength members. FIG. 15 describes a preferred embodiment of this tether invention when applied to a ground-gen system. In ground-gen AWE, the airborne device 1001 is flown actively to generate high tension in the tether portions 1002A & 1002B. Power is generated by pulling the working portion of the tether 1002A off of the drum 1003 under high tension until tether portion 1002A is exhausted. Then airborne device 1001 is positioned to generate as little tension as possible in tether portions 1002A and 1002B. Subsequently working tether portion 1002A is reeled back onto drum 1003. Non-working tether section 1002B is not rolled back onto winch 1003 during the power cycle, so the airborne device 1001 can maintain significant altitude and maneuvering room. The power generation cycle is then started again. Therefore, the working tether portion 1002A of the tether must operate at high tension as it is reeled continuously back and forth over drum 1003. This operation subjects the working tether portion 1002A to cyclic bending over sheave CBOS, and requires a substantial increase in the cross-sectional area of the working tether 1002A relative to non-working tether section 1002B which is subject primarily to tension loading. Therefore, the tether can be optimized in the manner described elsewhere, i.e. to make the working portion of the tether 1002A subject to CBOS larger and the nonworking portion 1002B smaller. In this case, the drag, overall weight, and cost of the tether are substantially improved.

The exemplary embodiments of the present invention may also have application in other fields, for example underwater energy generation techniques which differ from AWE systems only in that the working fluid is water. They can operate in ground-gen or fly-gen modes and the principles and advantages described herein may apply directly.

Figure 16:
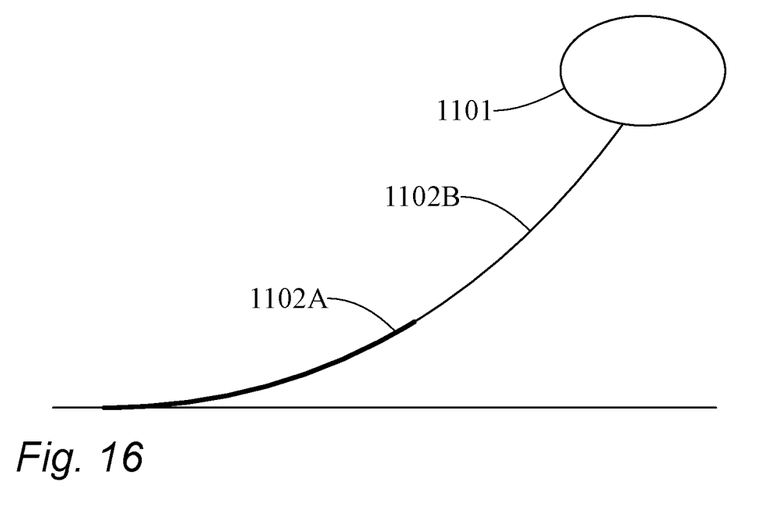
FIG. 16 is a front elevation view of a tethered aircraft showing a aerostat with variable cross section tether connected to a ground point.

As noted above, aerostats or other powered or unpowered tethered flight vehicles may benefit from the current invention. FIG. 16 illustrates an aerostat flight vehicle 1101 shown with varying cross-section tether 1102A and 1102B, which may have thermal, drag, and/or weight benefits for the flight vehicle 1101 when optimized using the techniques and designs that have been described herein.

While shown generally above with a circular cross-section, this is not required. Embodiments with a non-circular cross-section are possible as well, of course preferably having a variable cross-sectional areas, as shown and described herein.

Having shown and described a preferred embodiment of the invention, those skilled in the art will realize that many variations and modifications may be made to affect the described invention and still be within the scope of the claimed invention. Additionally, many of the elements indicated above may be altered or replaced by different elements which will provide the same result and fall within the spirit of the claimed invention. It is the intention, therefore, to limit the invention only as indicated by the scope of the claims.

We claim:

1. A tether for use with an airborne device, the tether comprising:
an elongate member having
a first end for attaching to a ground attachment point,
an opposing second end for attaching to the airborne device, and
an electrically conductive element that runs from the first end of the elongate member to the second end of the elongate member;
wherein the electrically conductive element has a cross-sectional area which varies across the elongate member.

2. The tether of claim 1 wherein:
the cross-sectional area of the electrically conductive element varies in discreet variation points.

3. The tether of claim 1 wherein:
the cross-sectional area of the electrically conductive element varies continuously across the member.

4. The tether of claim 1 wherein:
the cross-sectional area of the electrically conductive element varies near the mid-point of the tether.

5. The tether of claim 1 wherein:
the cross-sectional area of the electrically conductive element varies at least 2 times.

6. The tether of claim 1 further comprising:
a strength member running alongside the electrically conductive element and a jacket which surrounds the electrically conductive element, insulation, and strength member.

7. The tether of claim 1 wherein:
the cross-sectional area of a portion of the electrically conductive element that is near the ground connection point has a larger cross-sectional area than the remainder of the electrically conductive element.

8. The tether of claim 1 further comprising:
the cross-sectional area of a portion of the electrically conductive element that is near the attachment with the airborne device has a larger cross-sectional area than the remainder of the electrically conductive element.

9. The tether of claim 1 wherein:
the elongate member further comprises
a layer of insulation surrounding the electrically conductive element;
a second electrically conductive element which is alongside the first electrically conductive element and separated by the layer of insulation,
a strength member alongside the first and second electrically conductive elements, and
a jacket which surrounds the electrically conductive element, second electrically conductive element, insulation, and strength member.

10. An airborne wind energy system comprising:
an airborne device;
a tether comprised of an elongate member having a first end connected to the airborne device for and an opposing second end for; and
a ground station connected to the second end of the tether;
where the elongate member is comprised of an electrically conductive element having at least two sections with different cross-sectional areas.

11. The tether of claim 10 wherein:
the cross-sectional area of a section of the electrically conductive element found near the ground station has a larger cross-sectional area than the remainder of the electrically conductive element found along the elongate member.

12. The airborne wind energy system of claim 10 wherein:
one section of the electrically conductive element has a cross-sectional area that varies continuously.

13. The airborne wind energy system of claim 10 wherein:
one section of the electronically conductive element is near the attachment point with the ground station and has a smaller cross-sectional area than the remainder of the electronically conductive element.

14. The airborne wind energy system of claim 10 wherein:
one section of the electronically conductive element is near the attachment point with the airborne device and has a larger cross-sectional area than the remainder of the electronically conductive element.

15. A tether for use with an airborne device, the tether comprising:
an elongate member comprised of:
an electrically conductive member,
an insulation layer which surrounds the electrically conductive member,
a strength member; and
an outer jacket which surrounds the electrically conductive member, the insulation layer, and the strength member,
where the cross-sectional area of the electrically conductive member is different at two or more positions along the elongate member.

16. The tether of claim 15 further comprising:
a second electrically conductive member inside the outer jacket.

17. The tether of claim 15 wherein:
the electrically conductive member, the insulation layer, the strength member, and the outer jacket are each co-axial with one another.

18. The tether of claim 15 wherein:
the cross-sectional area of the electrically conductive member at a first position along the elongate member is approximately double the cross-sectional area of the electrically conductive member at a second position along the elongate member.

19. The tether of claim 18 wherein:
the tether has a first cross-sectional area of the electrically conductive member near an end of the elongate member while a central portion of the tether has a second cross-sectional area of the electrically conductive member,
where the second cross-sectional area is smaller than the first cross-sectional area.

20. The tether of claim 19 wherein:
the portion of the tether having the first cross-sectional area attaches to a ground connection.

* * * * *